(12) United States Patent
Mittal et al.

(10) Patent No.: US 12,216,720 B2
(45) Date of Patent: Feb. 4, 2025

(54) GROUP RECOMMENDATION FOR USER-GENERATED CONTENT

(71) Applicant: Microsoft Technology Licensing, LLC, Redmond, WA (US)

(72) Inventors: Arnav Mittal, Noida (IN); Franklin Geo Francis, Bangalore (IN); Taruna Manchanda, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/112,304

(22) Filed: Feb. 21, 2023

(65) Prior Publication Data
US 2024/0281482 A1   Aug. 22, 2024

(51) Int. Cl.
G06F 16/9535   (2019.01)
G06F 16/9536   (2019.01)

(52) U.S. Cl.
CPC ...... *G06F 16/9535* (2019.01); *G06F 16/9536* (2019.01)

(58) Field of Classification Search
CPC .................. G06F 16/9535; G06F 16/9536
See application file for complete search history.

(56) References Cited

U.S. PATENT DOCUMENTS 9,319,479 B2 * 4/2016 Canning ............... H04L 51/04
10,459,997 B1 * 10/2019 Agarwal ............... G06Q 50/01
11,337,036 B1 * 5/2022 Schu .................... H04W 8/18
2014/0181637 A1 * 6/2014 Eldawy ................. G06Q 50/01
                                                                715/234
2023/0336805 A1 * 10/2023 Xu ....................... H04N 21/812

OTHER PUBLICATIONS

"The Autonomous", Retrieved From: https://www.the-autonomous.com/, Retrieved Date: Dec. 14, 2022, 10 Pages.
Arya, Naveen, "Naveen Arya's Post", Retrieved From: https://www.linkedin.com/feed/update/urn:li:activity:6847418566455631872, Retrieved Date: Dec. 14, 2022, 11 Pages.
Desai, Anish, "Dr. Anish Desai. MD.'s Post", Retrieved From: https://www.linkedin.com/feed/update/urn:li:activity:6848481813829087232, Retrieved Date: Dec. 14, 2022, 3 Pages.
(Continued)

*Primary Examiner* — Jay A Morrison
(74) *Attorney, Agent, or Firm* — Cantor Colburn LLP; Renee D Brown

(57) ABSTRACT

Methods, systems, and computer programs are presented for recommending a group for posting content generated by a user. One method includes an operation for detecting a post of a user being added to an online service. The method further includes an operation for determining post interest scores for the post. The post interest scores are for a plurality of interests and each interest is associated with a topic. A match score is calculated for a plurality of groups based on the post interest scores, where the match score for each group indicates a degree of relevance of the post to the group. The method further includes operations for determining whether to recommend a group, from the plurality of groups, for including the post of the user in a feed of the recommended group, and for causing presentation of the recommended group based on the determined recommendation.

20 Claims, 14 Drawing Sheets

(56) References Cited

OTHER PUBLICATIONS

Junior, Juarez, "Juarez Junior, MSc's Post", Retrieved From: https://www.linkedin.com/feed/update/urn:li:activity:6848208032984289280, Retrieved Date: Dec. 14, 2022, 10 Pages.

Khanna, Parag, "Dr. Parag Khanna's Post", Retrieved From: https://www.linkedin.com/feed/update/urn:li:activity:6849233903471992832, Retrieved Date: Dec. 14, 2022, 11 Pages.

Koabari, Said, "Said Koabari PharmD,BCPS,BCMTMS,MBA,Msc's Post", Retrieved From: https://www.linkedin.com/feed/update/urn:li:activity:6848511212309884928, Retrieved Date: Dec. 14, 2022, 3 Pages.

Sharpton, Dianam. , ""Our Dance" #Poetry #Photography #DianaMarySharpton w/Martin Garrix & Bebe Rexha—In The Name Of Love #MusicVideo #Love", Retrieved From: https://www.dianamarysharpton.com/ds-blog/our-dance-poetry-photography-dianamarysharpton-wmartin-garrix-bebe-rexha-in-the-name-of-love-musicvideo-love?utm_content=buffer94a65&utm_medium=social&utm_source=twitter.com&utm_campaign=buffer, Oct. 31, 2017, 7 Pages.

Sharpton, Dianam. , "Diana Mary Sharpton's Post", Retrieved From: https://www.linkedin.com/feed/update/urn:li:activity:6849139476384509952, Retrieved Date: Dec. 14, 2022, 9 Pages.

Unseld, Robert, "Robert Unseld's Post", Retrieved From: https://www.linkedin.com/feed/update/urn:li:activity:6848954621021437953, Retrieved Date: Dec. 14, 2022, 13 Pages.

\* cited by examiner

FIG. 1

CONTENT-TO-INTEREST MAPPING

802

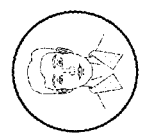

Joe Smith · 2nd
Developer Engagement Lead – Corp X

+ Follow ⋯

Follow this guide to deploy a simple #Spring #Cloud #microservice #application to run on #Cloud. Your #application will be accessible #online when completed and can be managed via the #Cloud portal. Try it!

CorpX #Developers

804

Content-to-interest mappings:

[Cloud Computing, 0.97], [Computer Networks, 0.96] [Technology, 0.93], [Information Technology, 0.91]

FIG. 8

GROUP-TO-INTEREST MAPPING

902 —

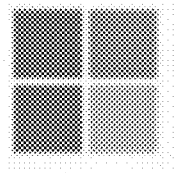

Cloud Developers

Listed group
47,121 members

904 — Group-to-interest mappings:
[Technology, 0.72], [Information Technology, 0.43], [Computer Networks, 0.37], [Cloud Computing, 0.37], [Data Management, 0.07]

906 —

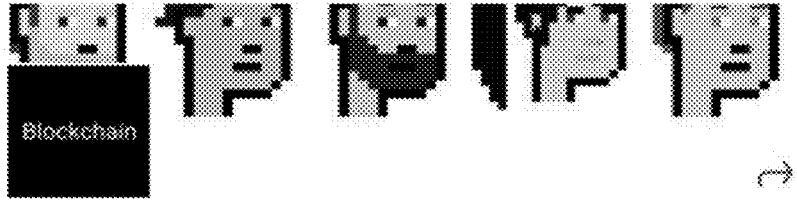

Developers, Engineers & Blockchain Minded People

Listed group
927 members

908 — Group-to-interest mappings:
[Technology, 0.39], [Information Technology, 0.19], [Finance and Economy, 0.13], [Data Management, 0.11], [Cryptocurrency, 0.11], [Blockchain Technology, 0.1]

FIG. 9

Content A – Group A 1002

|  | Cloud Computing | Computer Networks | Technology | Information Technology | Data Management |
|---|---|---|---|---|---|
| Content | 0.97 | 0.96 | 0.93 | 0.91 | - |
| Group | 0.37 | 0.37 | 0.72 | 0.43 | 0.07 |
| Int product | 0.36 | 0.36 | 0.67 | 0.39 | - |

Match score 1.78

Content A – Group B 1004

|  | Cloud Computing | Computer Networks | Technology | Information Technology | Blockchain | Finance | Crypto Currency |
|---|---|---|---|---|---|---|---|
| Content | 0.97 | 0.96 | 0.93 | 0.91 | - | - | - |
| Group | - | - | 0.39 | 0.19 | 0.11 | 0.13 | 0.1 |
| Int product | - | - | 0.36 | 0.18 | - | - | - |

Match score 0.54

FIG. 10

Content to Group Computation

| | Cloud Computing | Computer Networks | Technology (L1) | Information Technology | Business Management (L1) | Data Management |
|---|---|---|---|---|---|---|
| Content interests | 0.97 | 0.96 | 0.93 | 0.91 | 0.6 | - |
| Group interests | 0.37 | 0.37 | 0.72 | 0.43 | 0.4 | 0.07 |
| Int product | 0.36 | 0.36 | 0.67 | 0.39 | 0.24 | - |

1102

Match score = dot product score = 0.36+0.36+0.67+0.39+0.24 = 2.02

Contribution to match score from L1 groups = 0.67 + 0.24 = 0.91

Percentage contribution of L1 groups = 0.91/2.02 = 45%

FIG. 11

GROUP RECOMMENDATION FOR USER-GENERATED CONTENT

TECHNICAL FIELD

The subject matter disclosed herein generally relates to methods, systems, and machine-readable storage media for detecting when a user adds content to an online service, analyzing the content, and recommending a space for posting the user-generated content.

BACKGROUND

Social networks sometimes provide special areas where people with the same interest can communicate, such as groups, communities, clusters, etc. For example, in a professional social network, groups are community-oriented places where like-minded professionals on the platform share similar interests, connect, brainstorm, and collaborate on mutual topics of interest.

The social networks wish to have high traffic in these groups because high traffic generates more user engagement and revenue. Additionally, more traffic in the groups improves their value to the community as members learn from others with similar interests. However, sometimes the traffic in these groups is low when compared to the amount of traffic generated by users posting on their own feed. Also, traffic in groups may be low due to lack of awareness and discovery challenges for these communities, lack of awareness because users may not know that social networks offer these community-oriented features, and discovery because users often have difficulty finding communities that match their interests.

Since typically users create content for groups, it is difficult to increase group traffic without the cooperation of users. Thus, ways to increase group traffic are needed to increase user engagement and revenue.

BRIEF DESCRIPTION OF THE DRAWINGS

Various of the appended drawings merely illustrate example embodiments of the present disclosure and cannot be considered as limiting its scope.

FIG. 1 illustrates a screenshot of a user feed for a user, according to some example embodiments.

FIG. 8 illustrates the interests associated with the user post, according to some example embodiments.

FIG. 9 illustrates the interests associated with two groups, according to some example embodiments.

FIG. 10 illustrates the calculation of a matching score between content and two groups, according to some example embodiments.

FIG. 11 illustrates the computation of the matching score, according to some example embodiments.

DETAILED DESCRIPTION

Figure 2:
FIG. 2 is a User Interface (UI) for creating a post by the user, according to some example embodiments.

Example methods, systems, and computer programs are directed to recommending a group for posting content generated by a user. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

To solve awareness and content liquidity challenges for groups, a content-to-group recommendation framework is presented, alongside a real-time nudge system for creators on an online service to cross-post new user-generated content (UGC) into relevant groups. A content-to-group recommendation algorithm provides a method to identify topics, also referred to herein as interests, that relate to the content created, to identify interests that relate to different groups, and select the best group-recommendation for the content based on the interests of the content and the groups.

A timely nudge is presented, to suggest adding the post to a group in the online service, immediately after a post is created by a user (on the order of 100 ms). With several precision constraints and guardrails in place during model training and inference, the recommendations have a high degree of relevance to the content and creator. Further, since the nudges are potentially generated for a large number of users posting content on the online service, the amount of content added to groups has the potential for large growth in the number of weekly posts.

One general aspect includes a method that includes an operation for detecting a post of a user being added to an online service. The method further includes an operation for determining post interest scores for the post. The post interest scores are for a plurality of interests and each interest is associated with a topic. A match score is calculated for a plurality of groups based on the post interest scores, where the match score for each group indicates a degree of relevance of the post to the group. The method further includes operations for determining whether to recommend a group, from the plurality of groups, for including the post of the user in a feed of the recommended group, and for causing presentation of the recommended group based on the determined recommendation.

For the purposes of this description the phrases "an online social networking application" and "an online social network system" may be referred to as and used interchangeably with the phrases "an online system," "an online service," "a networked system," or merely "a connections network." It will also be noted that a connections network may be any type of an online network, such as, a professional network, an interest-based network, or any online networking system that permits users to join as registered members. For the purposes of this description, registered members of a connections network may be referred to as simply members or users, and some un-registered users may also access the services provided by the online service. As used herein, a "user" refers to any person accessing the service, either registered or unregistered. Further, some connections networks provide services to their members (e.g., search for jobs, search for candidates for jobs, job postings) without being a social network, and the principles presented herein may also be applied to these connection networks.

Figure 1:
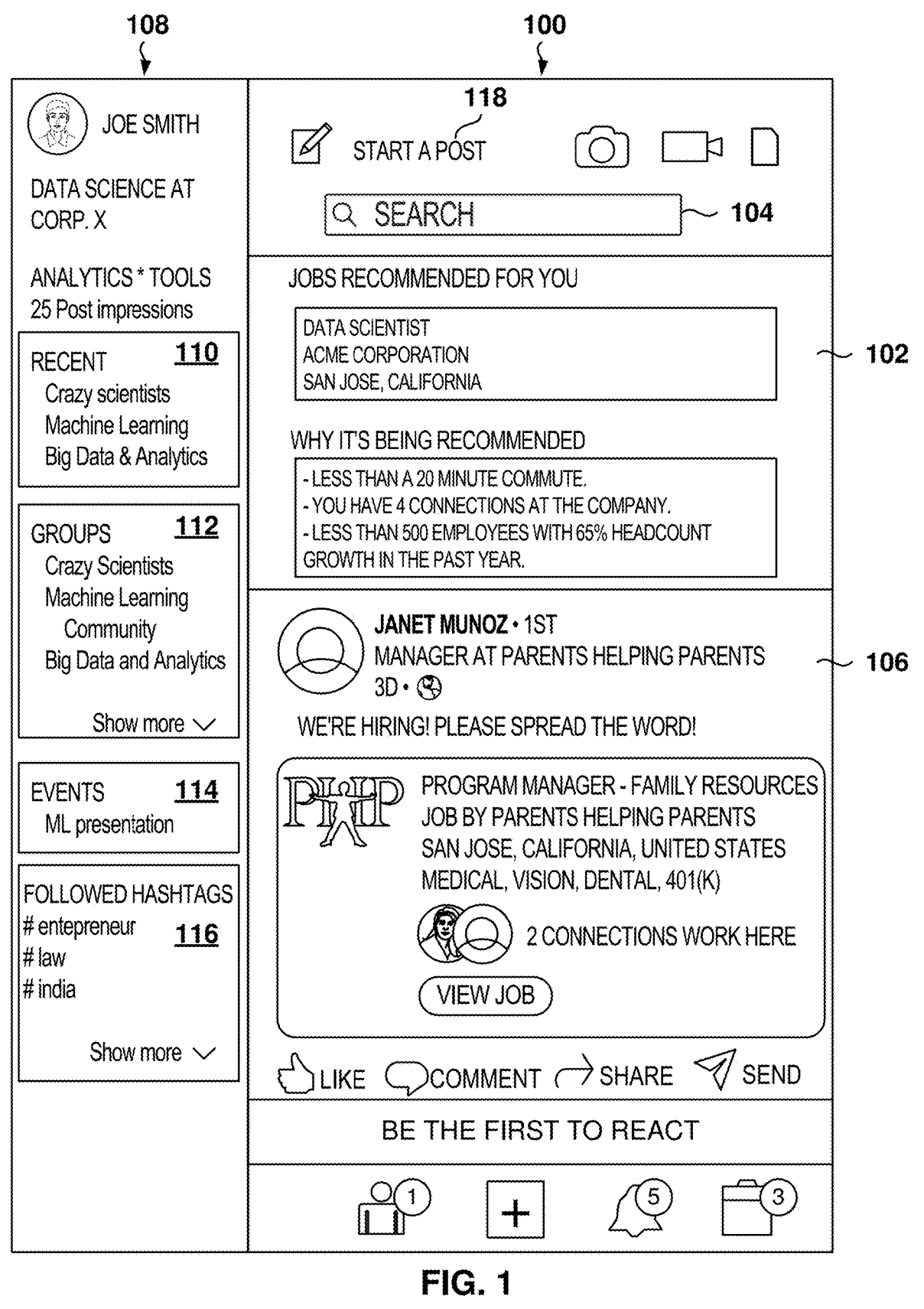

FIG. 1 illustrates a screenshot of a user page on an online service, according to some example embodiments. In the illustrated example, the user, named Joe Smith, may be a creator of content or a viewer of content generated by other users.

The user page includes a user feed 100 and a user area 108. The user feed 100 can include various categories such as a search field 104, job recommendations 102, notifications, content item 106, sponsored items, shortcuts, news, messages, articles, and the like. The content item 106 can be published or posted on the user feed 100 to be viewed by the user. Further, an option 118 is provided to start a post. After the user completes the post, the post is presented to connections of the user or is made public for the whole community to access.

In one example embodiment, a network service user interface provides the job recommendations 102 that match job interests of a member and that are presented without a specific job search request from the member, referred to herein as "jobs you may be interested in" (JYMBII). With the job recommendation 102, reasons why the job is being recommended can be included in a recommendation feature portion.

In another example embodiment, the user feed 100 includes suggestions or recommendations (not shown) for adding new connections (e.g., People You May Know [PYMK]). Similar to the job recommendation, the connection recommendation can include a recommendation feature portion that indicates reasons (e.g., features) why the connection recommendation was made, whereby the features are obtained from a rule list generated from a connection recommendation tree ensemble.

Similar recommendation feature portions can be provided for other recommendations presented by the networking server such as hashtag recommendations, follow recommendations, company recommendations, and so forth. Each of these recommendation feature portions can include features identified from a corresponding rule list generated from a corresponding tree ensemble. The user can engage with the content item 106 by "liking", commenting, sharing, sending the content item 106, and the like.

The user area 108 includes information about the user (e.g., name, picture, title), recent activity 110, groups 112, events 114, and followed hashtags 116. The groups 112 area includes information about the groups that the user belongs to, and the events 114 area provides information about events that the user is attending or may attend. Further, the hashtags 116 area provides a list of hashtags followed by the user.

When the user selects a group, a group feed is presented with information about the group. The group feed is similar to the user feed 100 but contains only items related to the topic of the group. Some groups may be open to anyone, while other groups contain one or more moderators that control who can join the group. Further, the items posted to the group may be configured to be viewed by the group members only or open to all members of the online service.

FIG. 2 is a User Interface (UI) 202 for creating a post by the user, according to some example embodiments. After the user selects the option 118 to start a post in the user feed, the UI 202 is presented. The user may fill in the content of the post in field 206, but other options are available to include other type of media, such as an image, a video, or a link to a webpage.

By selecting option 204, the user may make the post available to anyone in the online service or just to connections of the user. Additionally, hashtags can be suggested at the bottom to be included in the post. When the user selects the post option 208, the post is published on the online service.

Figure 3:
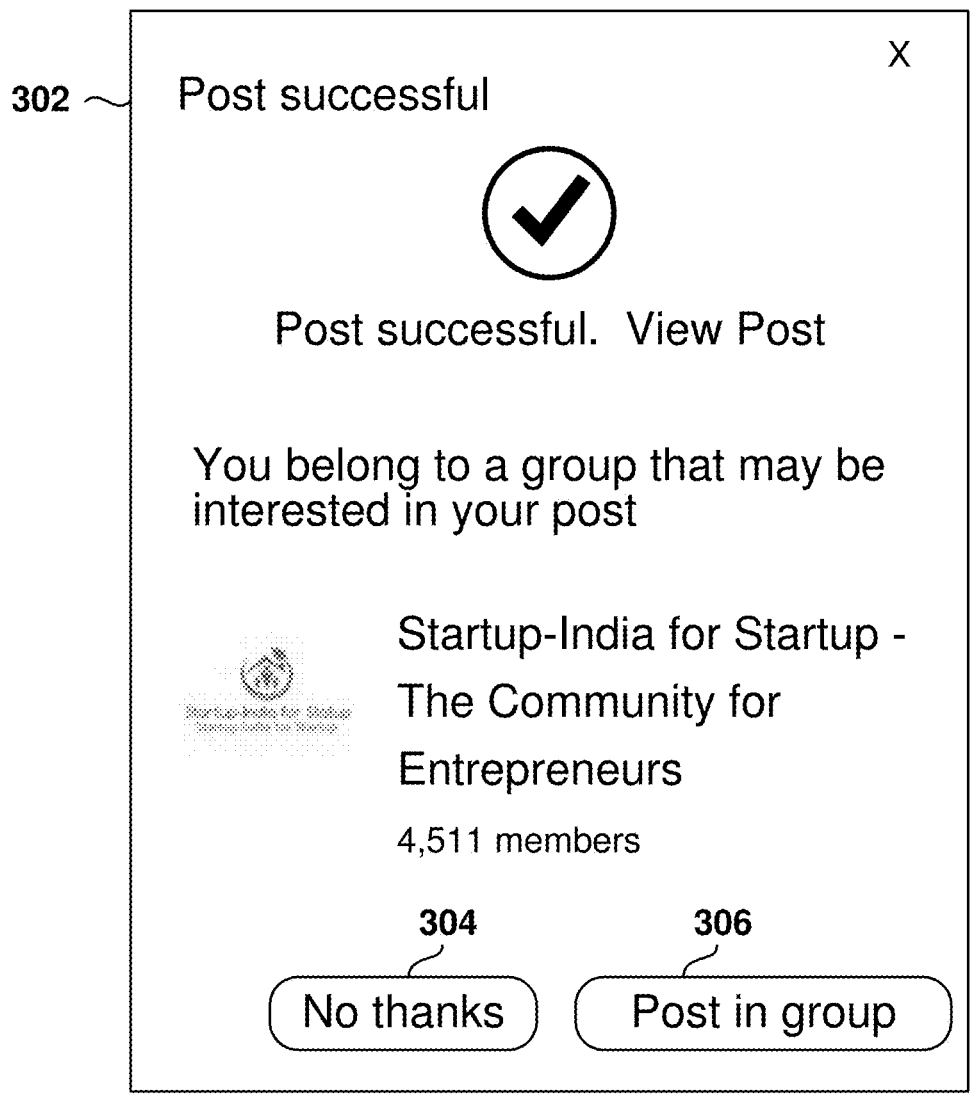
FIG. 3 is a UI for a suggestion, presented to the posting user, to add the post to a group, according to some example embodiments.

FIG. 3 is a UI 302 for a suggestion, presented to the posting user, to add the post to a group, according to some example embodiments. On a given week, there could be millions of users adding content to their feeds; however, only a few thousand members may be adding content to groups, which shows the relatively low content liquidity that is being added to the groups. The content is being distributed only within the users' networks, but the content is not being circulated within the communities that the users have joined, even though much of the content created would be relevant to some groups. For example, in one network, about 0.3% of the members of a group create content for the groups, while about 17% of these group members create content for their own user feeds. During some experiments, about 20% of such content created on the user's own feed was identified to be relevant to the groups where the authors were members.

One potential reason for the lack of traffic in groups could be that users are not joining groups, but evidence shows that this is not true because many users are already members of groups and access groups frequently.

One way to add traffic to groups is to raise awareness among users that the content they are creating could be a good post to place on a group. One perfect moment to raise awareness is when the user creates the post. In some example embodiments, the user is presented with a suggestion to let the user know that the content would be a good candidate for posting in a group, right after noting that the post was successful.

In some example embodiments, the user is presented with the suggestion right after selecting the button to create the post. In other embodiments, suggestions may also be presented while the user is creating the post. In the illustrated example, the user is offered a suggestion for one group (named Startup-India for Startup—The Community for Entrepreneurs), but other embodiments may offer more than one suggestion.

The user is provided with option 304 to ignore the suggestion and option 306 to accept the suggestion and post the content in the suggested group. If the user selects option 306, the post will be added to the group feed of the suggested group. In some example embodiments, a UI is provided to the user for editing the post if desired, before adding the post to the group. This UI is similar to the UI of FIG. 2, with an editing window and a post button, and when the user selects the post button, the content is posted on the feed of the group.

A good time to make the suggestion to post in the group is right after the user creates the post, because the subject matter is fresh in the user's mind and the content creator has shown the intent to share the content with the group, while sending other communications and waiting for a response always results in lower acceptance ratios.

However, for the suggestion to be effective the recommendation has to be for a group with a topic related to the topic of the post; otherwise, the user may be confused or show displeasure with a bad suggestion. Thus, the challenges are to generate a recommendation quickly and for the most relevant group for the created post.

Automatically detecting when a post is appropriate for a group is a technical challenge given the large amount of groups and different types of content that can be created. Additionally, it requires understanding of the subject matter of the post, which is a complicated problem for computer systems. The posts can have thousands of different topics to choose from and a single post can be related to multiple topics, e.g., the post, "#Artificial intelligence (AI) has had a significant impact on the #pharmaceuticalindustry and has the potential to revolutionize the way drugs are discovered, developed, and delivered to patients," is relevant to both the topics Artificial Intelligence (Technology), and Pharmaceutics (Health).

Topics can be very diverse, like "Machine Learning" and "Public Services," and be related to other topics, e.g., Machine Learning is related to, and is a subset of, Artificial Intelligence. Further, the group title and description, comprising a few words or sentences, are often not enough for a machine to capture the full extent of group topics: hence an alternate, scalable, and reliable data-based approach to decipher group topics is required. For example, a group with the title of "Sticky Branding," and the description "The Sticky Branding Group is for anyone interested in growing a Sticky Brand, may be difficult to obtain topics for given the little information known about the group.

Further, some content within groups can also be spam or irrelevant to the group topic and can lead to incorrect tagging of group topics. Apart from understanding of the subject matter of the post and groups, identifying the relevant group for a content is also challenging for a machine. In some scenarios, the post and group may relate to the same topics, but the intent behind the post may be against group rules of posting personal updates. For example, a post about the author announcing their new job in a DevOps role to their immediate network may not be a suitable post for a DevOps group that does not welcome such personal updates.

Additionally, a post may be partially or broadly relevant to a group topic but still not suitable for a recommendation. For example, a post about the latest Samsung smartphone (topics: Technology, Mobile Devices) may not be relevant for a Data Science group (topics: Technology, Artificial Intelligence, Machine Learning). A high confidence in the relevance between the post and group is required to ensure an optimal experience for the content author, and the users in the group.

Further, being able to make a recommendation immediately after the user posts to the user's feed is technically challenging because the computer system needs to quickly analyze the content and intent of the post and explore the different groups where this content could be posted, all this being performed in the order of a hundred milliseconds.

Adding content to groups can be very beneficial to the user, as it increases the exposure of the user on the online service, and more importantly, within a group of cohorts with a shared interest in a given topic. This expands the potential audience of the post to a larger number of users. Also, as the number of posts to the group increase, so will increase the engagement of group members, as the number of members in a group is typically between a few thousands and up to a few million.

Figure 4:
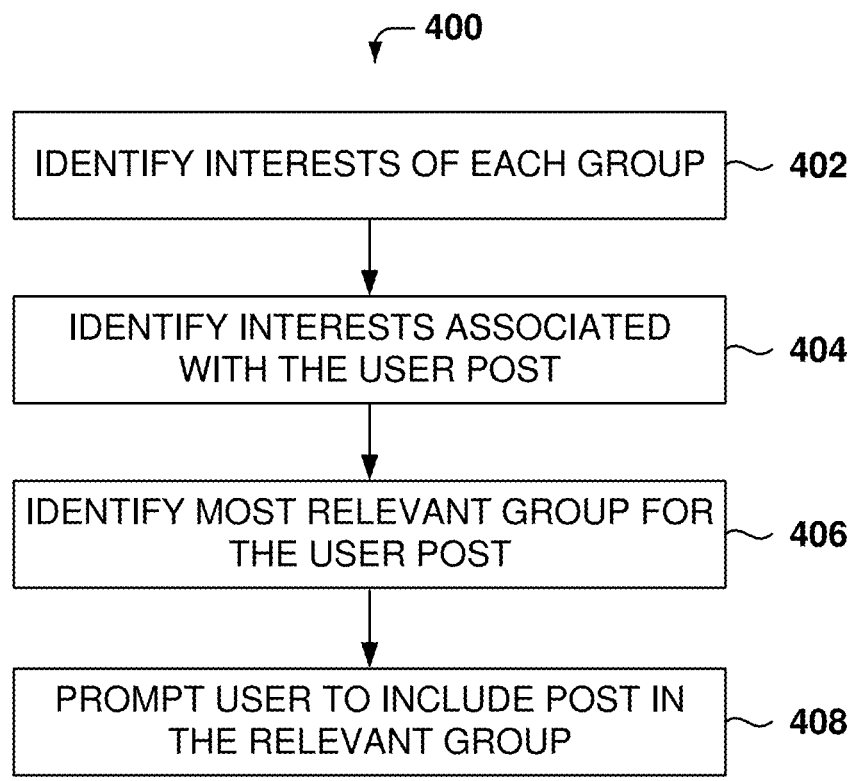
FIG. 4 is a flowchart of a method for making a group suggestion to the posting user, according to some example embodiments.

FIG. 4 is a flowchart of a method 400 for making a group suggestion to the posting user, according to some example embodiments. While the various operations in this flowchart are presented and described sequentially, one of ordinary skill will appreciate that some or all of the operations may be executed in a different order, be combined or omitted, or be executed in parallel.

At operation 402, the interests for each group are identified. This means that the online service performs an analysis to identify what each group is about. In some example embodiments, an interest ontology is used to define the possible topics for the groups and also the user post. More details about the interest ontology are provided below with reference to FIG. 5.

At operation 404, the topic, or topics, associated with the user post are identified. In some example embodiments, the topics are also categorized according to the interest ontology described below.

At operation 406, the most relevant group for the user post is identified based on the interests identified for the groups in for the user post. In some example embodiments, scores are calculated for the matches between the user post and each group, and the match with the best score, and that satisfies all the applied filtering criteria, is selected.

If the score is above a predetermined threshold, then the group with the highest score is recommended at operation 408. If no match has a score above the predetermined threshold, then the group recommendation is not made. Details are provided below with reference to FIGS. 10-11 for determining the best group, or groups, for the user post.

It is noted that one goal is to provide a group recommendation right after the user adds the post, so the calculation on what is the most relevant group has to be calculated quickly. In some experiments, the calculation was performed in about 100 ms, which appears instantaneous to the user.

Figure 5:
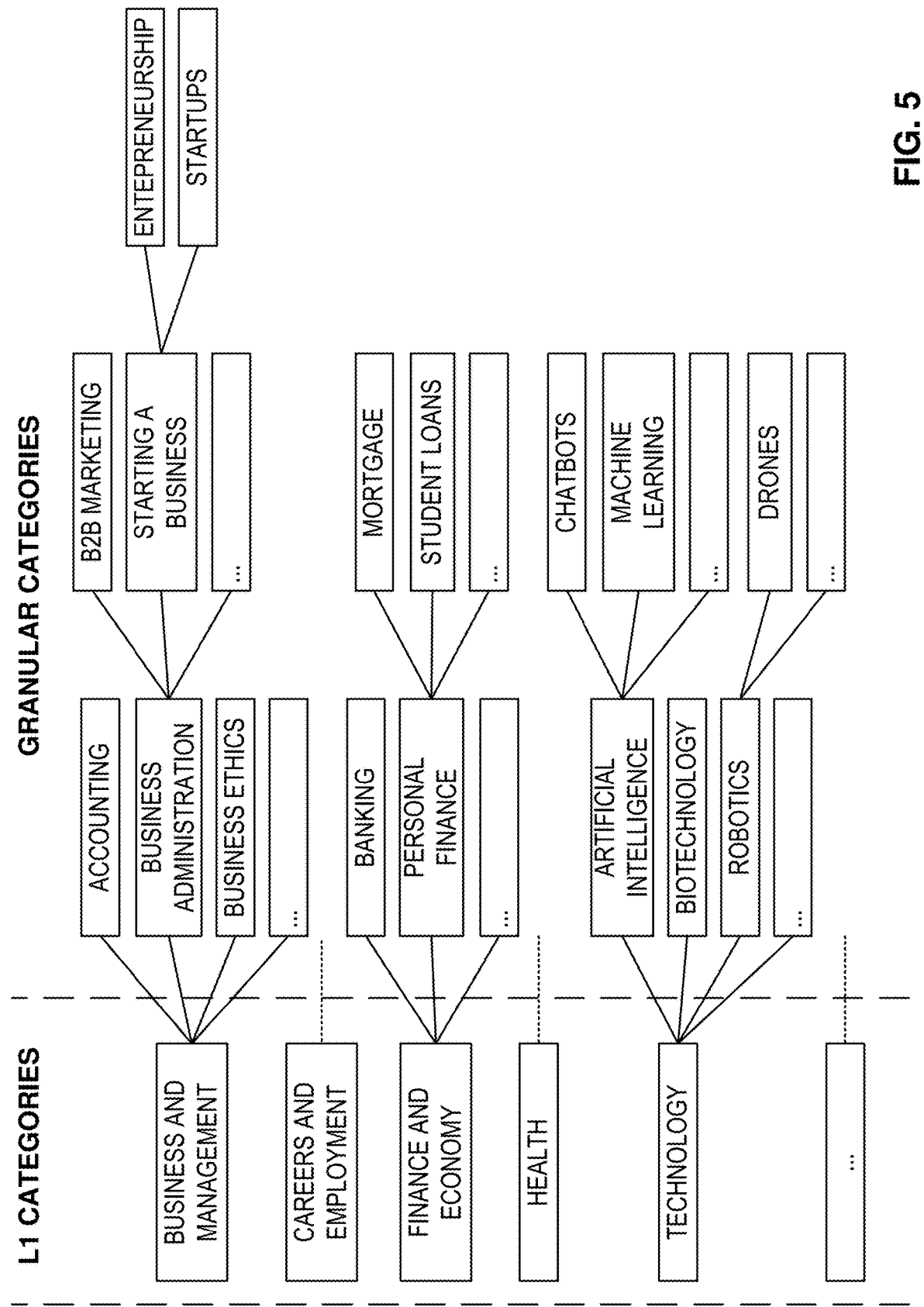
FIG. 5 illustrates an interest graph of topics, according to some example embodiments.

FIG. 5 illustrates an interest graph of topics, according to some example embodiments. In some example embodiments, LinkedIn's interest graph is used to identify topics or interests, but other embodiments may use other topic categorizations.

The interest graph is an interest ontology consisting of several hundred categories arranged in a hierarchical tree-like order. There are 17 interests, also referred to herein as categories, at the first level, called L1 interests, and then each interest may have other sub-interests in the next level, down to the interests at the last level that are referred to as leaf interests. There are more 850 interests below the L1 interests, arranged in a graph structure as illustrated in FIG. 5.

More general interest categories are the 'parents' of more specific interest categories. For example, Finance and Economy is the parent of Personal Finance, which itself is a parent of Student Loans. It is noted that an interest category can have more than one parent.

Each interest provides information on what the content associated with that interest is about. The interest graph ontology is intended to describe topics that members might be interested in and capture what content shared by users (e.g., posts, articles, etc.) is "about."

In some example environments, an interest category includes the following information:
  Label: interest category name;
  URN: Unique Reference Number
  IRI: Internationalized Resource Identifier;

Description: Definition and scope of the interest category;
Parent categories: One or more parent nodes under which the interest is placed in the hierarchy;
Hashtags: One or more hashtags used to produce single-label training data for the interest category;
Search Queries: One or more search queries used to produce single-label training data for the interest category;
RSS Feeds: One or more URLs used to produce single-label training data for the interest category; and
Activity URNs: One or more posts that are about the interest category.

In some example embodiments, the L1 interests include Arts and Entertainment; Business and Management; Careers and Employment; Finance and Economy; Health, Marketing and Advertising; Politics and Law; Science and Environment; Society and Culture; Technology; Lifestyle and Leisure; Education and Learning; Sales and Retail; Sports and Fitness; Construction and Real Estate; Manufacturing and Supply Chain; and Vehicles and Transportation.

Given a piece of text (an article, a post, a news item, etc., the goal is to identify the most specific sub-set of interest categories from the ontology that best represents the subject matter of the content. Most-specific refers to the sub-set of topical interests located at the deepest levels of the ontology that apply, starting from one of the roots.

In some example embodiments, a machine learning model, referred to herein as the interest model, is used to determine the interest associated with a piece of text. The interest model takes as an input the piece of text and generates a list of interests that are associated with the text together with a corresponding score, where the higher the score for an interest, the more relevant is the interest to the text.

Figure 6:
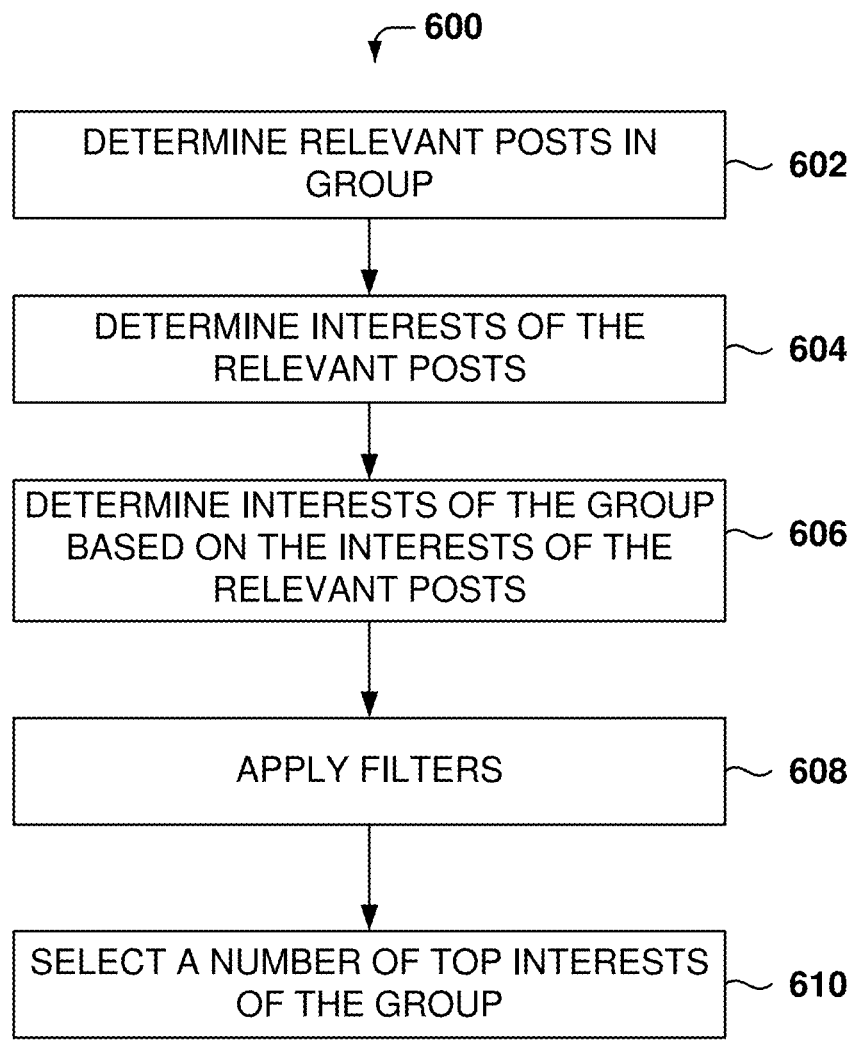
FIG. 6 is a flowchart of a method for identifying interests for a group, according to some example embodiments.

FIG. 6 is a flowchart of a method 600 for identifying interests for a group, according to some example embodiments. While the various operations in this flowchart are presented and described sequentially, one of ordinary skill will appreciate that some or all of the operations may be executed in a different order, be combined or omitted, or be executed in parallel.

To understand the interests relevant to a group, the posts within the group are used as a proxy for deciphering group interests. The interests of group posts are then aggregated to generate group-to-interest mappings (G2I). However, not all group content may assist in determining interest because some of the content may be promotional spam or irrelevant to the group interest. To avoid such posts from adding noise, the posts that receive at least 1 response (in the form of a like/reaction/comment) are considered for the calculation of the group interests. This serves as an automated proxy for content quality checks where posts having at least 1 response are considered to be higher quality and more related to the group topic.

Thus, at operation 602, the posts that are relevant to the group are determined. In some example embodiments, the relevant posts are those post that have at least one response from member of the groups, but other embodiments may include a higher number of responses as the threshold for selecting posts.

Additional filtering may be performed on the posts, such as selecting posts from the most recent three months for calculating the interests, or discarding posts that are for items for sale, congratulations, etc., even if these posts have had user interactions.

At operation 604, the interests of each of the relevant posts are identified. In some example embodiments, the interest model uses as input each post and generates a list of interests, with respective scores, for each post.

At operation 606, the interests of the group are determined based on the interests for the posts identified at operation 604. In some example embodiments, for each interest, the group interest is calculated as the average of the posts interest scores, that is, the sum of the interest score across all posts divided by the number of posts. Other embodiments, may utilize other aggregation calculations, such as the median, the geometric average, etc. The result is a list of interests for the group with each interest having a respective group interest score.

At operation 608, filters are applied to the list of interests. During some experimentation, it was observed that there could be a "long-tail" effect for the list of interests, that is, there are a few interests with high scores and then a long list of interests with low scores.

To avoid the long-tail effect, a predetermined number of interests are selected with the highest group interest scores, and the remainder are discarded for further consideration. In some example embodiments, the maximum number of interests for the group is capped at 12, but other embodiments may use other caps, such as in the range from 5 to 25. Thus, at operation 610, a predefined number of the interests with the highest scores are selected as the list of interests for the group.

Further, a minimum frequency of occurrence of an interest in the post of the groups is used to select the posts to be considered.

During one experiment, different thresholds for the number of interests were analyzed and the frequency in which the interests appear in the group posts were analyzed. The results showed that selecting the top 12 interests provided the best results, but this number may be periodically optimized based on changing conditions. In particular, selecting the top 12 interests by score that show up in at least 6% of all posts within the group gave the best results.

Thus, 6% is a frequency filter, so the interest should have at least this frequency of occurrence within the group, and the score that we are associating with this particular interest and the group should be high enough to be in the top 12 interests getting tagged to that group.

Figure 7:
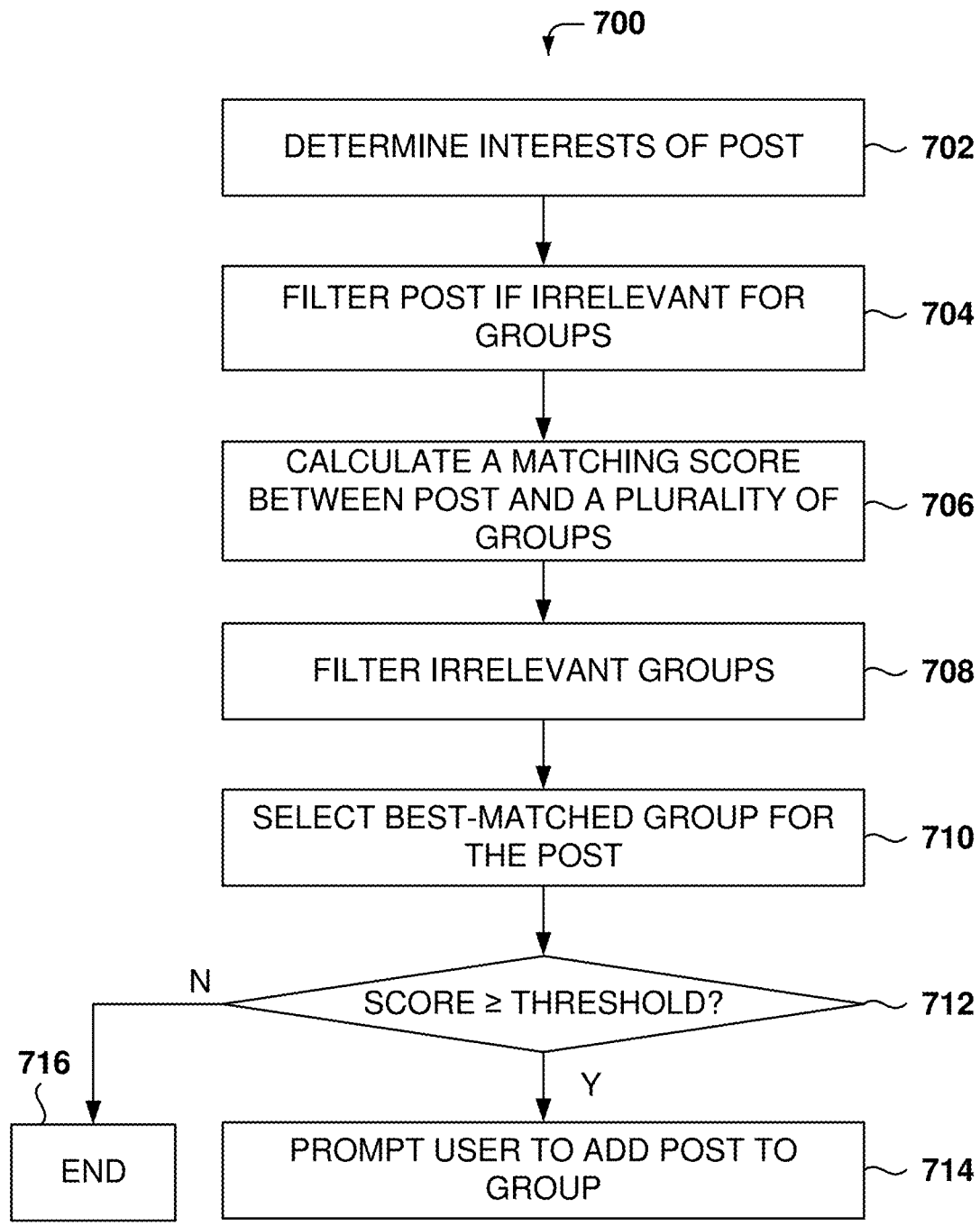
FIG. 7 is a flowchart of a method for identifying relevant groups for a post, according to some example embodiments.

FIG. 7 is a flowchart of a method 700 for identifying relevant groups for a post, according to some example embodiments. While the various operations in this flowchart are presented and described sequentially, one of ordinary skill will appreciate that some or all of the operations may be executed in a different order, be combined or omitted, or be executed in parallel.

At operation 702, the interests of the post are determined. In some example embodiments, the interest model is used to determine the interests of the post by feeding the content of the post to the interest model, resulting in the list of interests with respective interest scores.

Further, at operation 704, the post may be filtered out from further consideration if the post is irrelevant for the groups. For example, posts that are commercial offers, or spam, or congratulations for a new job, are discarded from further consideration and there will be no group recommendation when the user creates the post. By filtering irrelevant posts, response latency is improved.

At operation 706, matching scores are calculated for a plurality of groups. In some example embodiments, the groups where the user is a member are considered, but other embodiments may consider other groups, or even all the groups.

The matching score, between the post and a group, measures how closely related the post is to the group, where the higher the matching score, the closer the post and the group are regarding common interests.

At operation 708, irrelevant groups are filtered out. In some example embodiments, the groups with a matching score below a predetermined threshold are eliminated from further consideration.

At operation 710, the best matched group is selected for the post. In some example embodiments, from the remaining groups that have not been filtered out and if the post has not been filtered out, the group with the highest matching score is selected for the suggestion.

At operation 712, a check is made to determine if the matching score is greater than a predetermined threshold. If the matching score is greater than or equal to the threshold, then the method flows to operation 714. If the matching score is not greater than the threshold, then the method flows to operation 716 where no suggestion will be provided.

At operation 714, a prompt will be presented to the user suggesting to add the post to the best-matched group, such as in the interface illustrated in FIG. 3.

In some example embodiments, if the recommendation is for a group where the user is not a member, then an additional option is presented to the user for joining the recommended group.

FIG. 8 illustrates the interests associated with the user post, according to some example embodiments. Post 802 has been posted by user Joe Smith, a developer, with the post text being as follows:

Follow this guide to deploy a simple #Spring #Cloud #microservice #application to run on #Cloud. Your #application will be accessible #online when completed and can be managed via the #Cloud portal.
Try it!
CorpX #Developers The identification of interests 804 for this post has produced a list of four interests: Cloud Computing, interest score 0.97; Computer Networks, interest score 0.96; Technology, interest score 0.93; and Information Technology, interest score 0.91.

Thus, the text of the post is very technical and related to the cloud development, so the four identified interests are a good match for this post. Further, it is noted that the scores provide a reference number to compare two interests. For example, a score of 0.35 is a better match than a score of 0.24. However, it does not mean that a score of 0.90 is twice "as good" as a score of 0.45.

FIG. 9 illustrates the interests associated with two groups, according to some example embodiments. Group 902 is for Cloud Developers with more than 47K members. After analyzing the posts of the Cloud Developers group, the following list of interests 904 were determined for this group: Technology, interest score 0.72; Information Technology, interest score 0.43; Computer Networks, interest score 0.37; Cloud Computing, interest score 0.37; and Data Management, interest score 0.07.

The list of interests makes sense as cloud development is a technical concept so interests like Technology, Information Technology, and Cloud Computing are identified.

In the other example, group 906 is for Developers, Engineers & Blockchain Minded People, with about 900 members. As the name indicates, the group is for developers and engineers interested in the block chain technology.

The following list of interests 908 were determined for this group: Technology, interest score 0.39; Information Technology, interest score 0.19; Finance and Economy, interest score 0.13; Data Management, interest score 0.11; Cryptocurrency, interest score 0.11; and Blockchain Technology, interest score 0.1.

FIG. 10 illustrates the calculation of a matching score between content and two groups, according to some example embodiments. To calculate the match score of content to group, the interest scores for content and group are used. In some example embodiments, a dot product operation is used, but other embodiments may use other calculations based on the interest scores of content and group.

The dot product is an algebraic operation that takes two equal-length sequences of numbers and returns a single number. The dot product is the sum of the products of the corresponding entries of the two sequences of numbers. The higher the dot score is for a pair, the higher the match scores, which indicates the confidence that the topic of the post is relevant for the topic of the group.

Table 1002 illustrates the calculation of the dot product. The first row of the table 1002 defines the columns for the table and includes the interest names. The second row is for the content and includes the corresponding interest scores, and the third row is for the group and includes the corresponding interest scores for the group. The fourth row shows the interest product, which is the result of multiplying the interest scores for the content and group in each column.

Thus, the result of multiplying the interest scores for cloud computing is 0.97×0.37, which is 0.36. For Data Management in the last column, the interest score for the post is zero, therefore, the interest product is also zero.

Finally, the values on the last row are added to calculate the dot product. In this example, the sum of 0.36, 0.36, 0.67, and 0.39 is 1.78, which is the dot product of the interests for group and content, which is the match score for the pair content-group.

The second example illustrated in table 1004 is for calculating the match score for the same content and another group. In this case, the interests in common are Technology and Information Technology and the resulting match score is 0.54.

The group with the highest match score is selected as the candidate for the group recommendation. In other embodiments, more than one group may be recommended. The group recommendation is presented to the user if the match score content-group exceeds a predetermined threshold. In some experiments, it was determined that a threshold of 0.3 for the match score generates 60-70% precise recommendations. Other embodiments may use other thresholds to increase or relax accuracy.

FIG. 11 illustrates the computation of the matching score, according to some example embodiments. There are some cases where the process described with reference to FIG. 10 produces undesired results, so additional filtering may be performed to eliminate some groups from being recommended, even if the groups have a high match score.

In cases where the interest matching only identify matches for L1 categories, the recommendations were not relevant. For example, a post about smartphones resulted in a recommendation for a Data Science group because they both had a strong interest score on L1 interest Technology. Although the post and the group are both very relevant to Technology, in practice the recommendation is poor as it does not consider that the niche interests are different.

In another example observed during experimentation, a post about Sean Baker's latest movie received a recommended group for a writer's network group, not a good match. The post and the group are related to L1 Arts and Entertainment interest, but the contribution of this interest to the match score was more than 90%.

Table 1 below includes several posts with the recommended group obtained during experimentation, and the corresponding top matching interests with the quality of the recommendation. In the right column, comments are included from the developers explaining how the quality of the recommendations was determined, e.g., when a post broke a rule for self-promotional content. The analysis of the quality helped in fine-tuning the algorithm for selecting recommendations for posting in the group.

TABLE 1

| Post Text | Recommended Group | Top Matching Interests |
|---|---|---|
| Follow this guide to deploy a simple #Azure #Spring #Cloud #microservice #application to run on #Azure. Your #application will be accessible #online when completed and can be managed via the #Azure portal. Try it! http://msft.it/6013XdI3W #Microsoft #MSDevIRL #Developers | Azure Developers | Technology, 0.65, IT Infrastructure, 0.38, Information Technology, 0.37, Cloud Computing, 0.34, Computer Networks, 0.34, Recommendation Quality: Good |
| The climate will not adapt to us; we will have to adapt to it. My new feature essay in National Geographic, adapted from the new book MOVE. | Climate Change Professionals | Science & Environment, 0.36, Climate and Meteorology, 0.09, Natural World, 0.08, Climate Change, 0.07, Recommendation Quality: Good |
| Most Effective Ayurvedic Treatment OF Hepatitis ∣ In English ∣ Dr. Naveen Arya ∣ Ayurveda Yogashram | #Ayurveda This is a group of Ayurveda professionals. | Health, 0.67, Traditional & Alternative Medicine, 0.33, Ayurveda, 0.26, Recommendation Quality: Good |
| So delighted and excited to represent #Ambulatory #Healthcare #Services and be a part of #International #SEHA #clinical #pharmacy #conference The talk will be about the summary of 6 years journey in #Antimicrobial #stewardship #application. #SICPC https://lnkd.in/gAJku6h7 Wish to see All of you there. For complementary registration | Pharmacists | Health, 0.5, Medicine, 0.25, Medical Sciences, 0.16, Healthcare, 0.03, Recommendation Quality: Bad Against group rules on posting self-promotional content |
| Fun fact from conference #theautonomous (for obvious reasons this time not quoting who): tech people have the Know-how to judge technology for autonomous driving, which the legislation unfortunately has not. #autonomousdriving | Self-Driving Cars | Technology, 0.51, Robotics, 0.33, Engineering, 0.28, Science and Environment, 0.26, Self-Driving Cars, 0.09, Recommendation Quality: Good |
| Putative Role of Vitamin D for COVID-19 Vaccination Vitamin D enhances the innate immunity needed to fight COVID-19 by activating Toll-2 receptors. It also enhances the synthesis of antimicrobial peptides, promotes autophagy through the formation of autophagosomes, . . . | Clinical Research Professionals | Health, 0.56, Medicine, 0.37, Medical Sciences, 0.33 Recommendation Quality: Good |
| IntelliMed Healthcare Solutions #vitamind #vaccination #covid-19 #covid19vaccination #nutraceuticals #medicalaffairs #covid #healthcare | | |
| Sean Baker's latest film, Red Rocket, shocked audiences at the Telluride Film Festival, and will likely do the same when it hits the New York Film Festival soon . . . | The Writers' Network | Arts and Entertainment, 0.41, Movies, 0.05 Recommendation Quality: Bad Group is for writers, post is about movies. Only 2 interests match. of which L1 interest score contribution is 90% |
| Our Dance #Poetry #Photography #DMS w/Martin Garrix & Bebe Rexha - In The Name Of Love #Music Video #Love | Poetry Editors & Poets | Arts and Entertainment, 0.68 Literature, 0.48 Recommendation Quality: Bad Group rule against sharing personal poetry |

To avoid this problem of matches based mostly on L1 interests, an additional enforcing condition is added to ensure recommendations are made when there is a sufficient match at the niche interest level, where niche interest refers to interests below the L1 level in the interest ontology. Thus, the recommendation will be for the group that has the highest match score and that also has a minimum sufficient contribution of matching granular interests, referred to herein as the satisficing condition. This check significantly improves precision by avoiding publishing recommendations where content and group topics are only matched at a high level or vaguely related.

In some example embodiments, the satisficing condition is that the contribution of broad interests (L1 level) to the match score should not exceed a predetermined amount of the overall match score. In some example embodiments, the L1 contribution is capped at 90% of the match score, but other embodiments may use other thresholds, such as a value in the range from 50% to 95%. That is, if the contribution to the match score, in the calculation of the dot product operation, of the L1 interests is greater than 90%, then the group will be eliminated as a candidate for the recommendation.

In the illustrated example, table 1102 shows the calculation of the match score for a post in a given group, which is 2.02. Further, there are two L1 interests in common: Technology and Business Management. The respective contributions to the match score are 0.67 and 0.24, which add up to 0.91.

Further, the relative contribution of the L1 interests to the match score is the result of dividing the contribution of the L1 interests over the match score, which in this case is 0.91 divided by 2.02, a result of 45%.

Assuming a threshold of L1 contribution of 90%, the L1 contribution of 45% is less than the threshold; therefore, this group is a potential candidate for recommendation. If the L1 contribution had been greater than the threshold, then this group would not be recommended, and the group with the next highest match score and satisfying the L1 contribution threshold will be considered for a recommendation.

As indicated above, posts may also be filtered based on the intent of the post. For example, posts for a personal update or congratulate someone are not suggested to a group for adding the post.

In some example embodiments, an intent ML model generates an intent of the post from a plurality of intents based on the text of the post. The posts that would be eliminated from group recommendations include posts with one of the following intents: share event, share personal update, seek help or support, share achievement, thank or congratulate, and share job opportunity.

The intent ML model is trained with training data based on past content and assigned labels for the different types of intent. The intent ML model takes as input a piece of text and generates as an output one of the intents from the plurality of identified different types of intent.

The posts that would be eligible for group recommendations include posts with one of the following intents: share knowledge or advice, promote product or service, share opinion, share company update, share news reporting, and other post intent.

Figure 12:
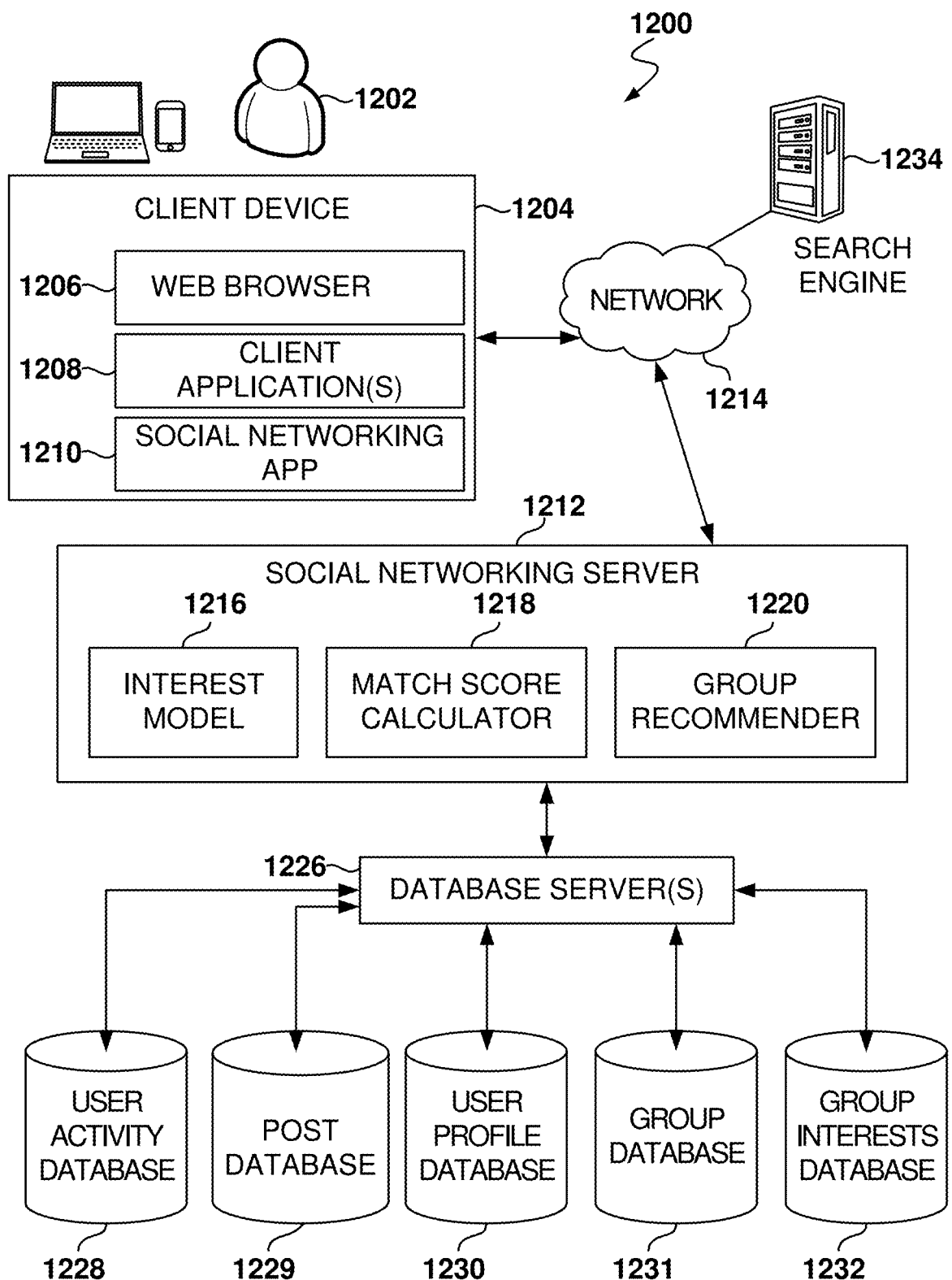
FIG. 12 is a block diagram illustrating a networked architecture, according to some example embodiments.

FIG. 12 is a block diagram illustrating a networked architecture 1200, according to some example embodiments. The networked architecture 1200 includes a networking server 1212, illustrating an example embodiment of a high-level client-server-based network architecture. Embodiments are presented with reference to an online service, and, in some example embodiments, the online service is a social networking service.

The social networking server 1212, a distributed system comprising one or more machines, provides server-side functionality via a network 1214 (e.g., the Internet or a wide area network (WAN)) to one or more client devices 1204. FIG. 12 illustrates, for example, a client device 1204 with a web browser 1206, client application(s) 1208, and a social networking app 1210 executing on the client device 1204. The social networking server 1212 is further communicatively coupled with one or more database servers 1226 that provide access to one or more databases 1228-1232.

The social networking server 1212 includes, among other modules, an interest model 1216, a match-score calculator 1218, and a group recommender 1220. The interest model 1216 is the model that calculates scores for interests associated with a text segment, and the match-score calculator 1218 calculates the match score between a post and a group. The group recommender 1220 determines if a group recommendation will be presented to the user that is posting new content.

The client device 1204 may comprise, but is not limited to, a mobile phone, a desktop computer, a laptop, a tablet, a netbook, a multi-processor system, a microprocessor-based or programmable consumer electronic system, or any other communication device that the user 1202 may utilize to access the social networking server 1212. In some embodiments, the client device 1204 may comprise a display module (not shown) to display information (e.g., in the form of user interfaces).

In one embodiment, the social networking server 1212 is a network-based appliance, or a distributed system with multiple machines, which responds to initialization requests or search queries from the client device 1204. One or more users 1202 may be a person, a machine, or other means of interacting with the client device 1204. In various embodiments, the user 1202 interacts with the networked architecture 1200 via the client device 1204 or another means.

In some embodiments, if the social networking app 1210 is present in the client device 1204, then the social networking app 1210 is configured to locally provide the user interface for the application and to communicate with the social networking server 1212, on an as-needed basis, for data and/or processing capabilities not locally available (e.g., to access a user profile, to authenticate a user 1202, to identify or locate other connected users 1202, etc.). Conversely, if the social networking app 1210 is not included in the client device 1204, the client device 1204 may use the web browser 1206 to access the social networking server 1212.

In addition to the client device 1204, the social networking server 1212 communicates with the one or more database servers 1226 and databases. In one example embodiment, the social networking server 1212 is communicatively coupled to a user activity database 1228, a post database 1229, a user profile database 1230, a group database 1231, and a group interests database 1232.

The user activity database 1228 keeps track of the activities of the users in the online service, and the post database 1229 keeps information about the posts generated by users, including the posts added to groups. The user profile database 1230 keeps profile information about the users. The group database 1231 keeps information about the groups in the online service, and the group interests database 1232 keeps the calculated interests for the different groups in the online service. Since the interests of the groups tend to remain constant, the group interests are calculated periodically.

In some example embodiments, when a user 1202 initially registers to become a user 1202 of the social networking service provided by the social networking server 1212, the user 1202 is prompted to provide some personal information, such as name, age (e.g., birth date), gender, interests, contact information, home town, address, spouse's and/or family users' names, educational background (e.g., schools, majors, matriculation and/or graduation dates, etc., employment history (e.g., companies worked at, periods of employment for the respective jobs, job title), professional industry (also referred to herein simply as "industry"), skills, professional organizations, and so on. This information is stored, for example, in the user profile database 1230. Similarly, when a representative of an organization initially registers the organization with the social networking service provided by the social networking server 1212, the representative may be prompted to provide certain information about the organization, such as a company industry.

The networked architecture 1200 may also include a search engine 1234. Although only one search engine 1234 is depicted, the network architecture 1200 may include multiple search engines 1234. Thus, the social networking server 1212 may retrieve search results (and, potentially, other data) from multiple search engines 1234. The search engine 1234 may be a third-party search engine.

Figure 13:
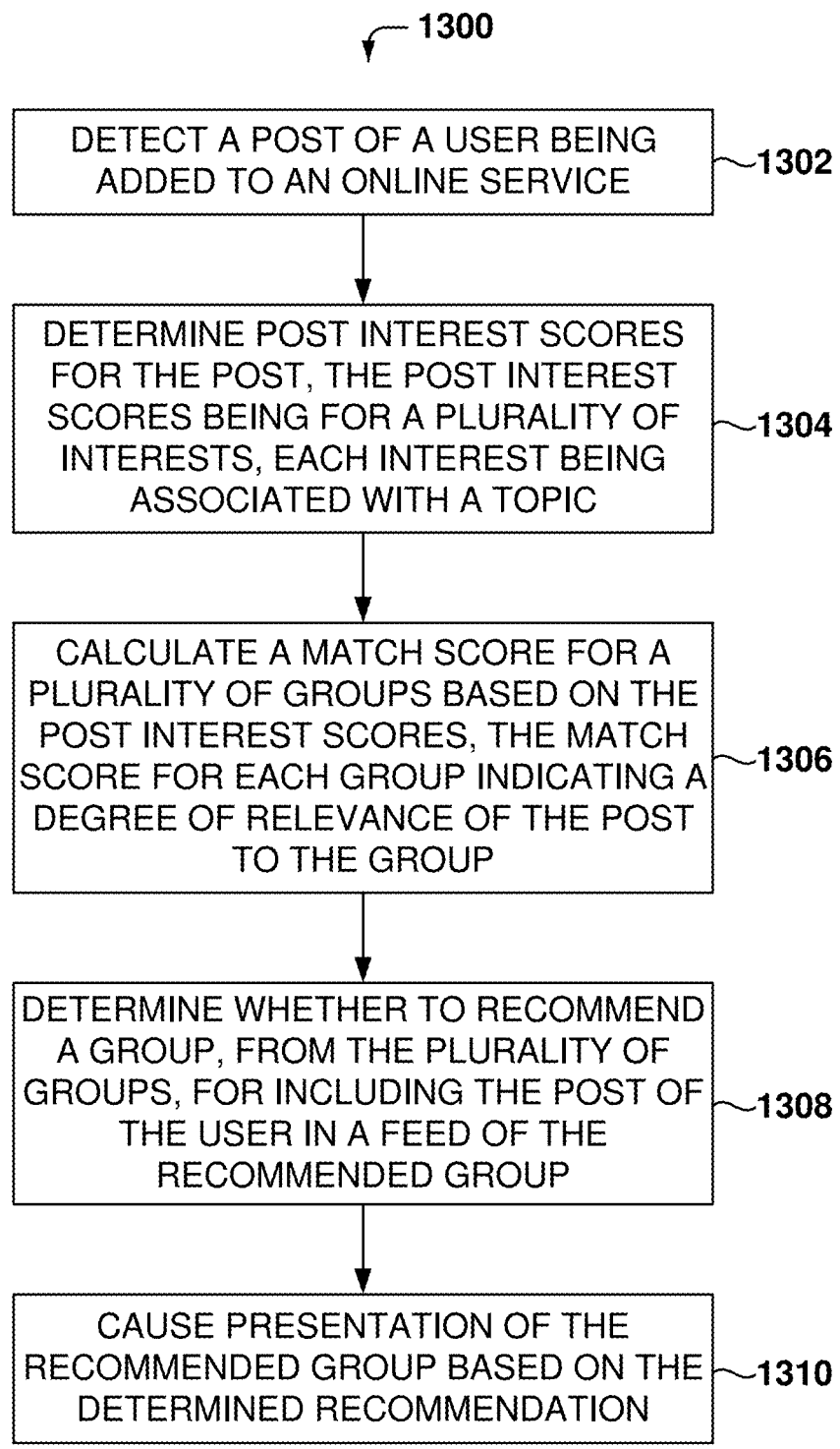
FIG. 13 is a flowchart of a method for recommending a group for posting content generated by a user, according to some example embodiments.

FIG. 13 is a flowchart of a method 1300 for recommending a group for posting content generated by a user, according to some example embodiments. While the various operations in this flowchart are presented and described sequentially, one of ordinary skill will appreciate that some or all of the operations may be executed in a different order, be combined or omitted, or be executed in parallel.

Operation 1302 is for detecting a post of a user being added to an online service.

From operation 1302, the method 1300 flows to operation 1304 to determine post interest scores for the post, the post interest scores being for a plurality of interests, each interest being associated with a topic.

From operation 1304, the method 1300 flows to operation 1306 for calculating a match score for a plurality of groups based on the post interest scores, the match score for each group indicating a degree of relevance of the post to the group.

From operation 1306, the method 1300 flows to operation 1308 for determining whether to recommend a group, from the plurality of groups, for including the post of the user in a feed of the recommended group.

From operation 1308, the method 1300 flows to operation 1310 to cause presentation of the recommended group based on the determined recommendation.

In one example, calculating the match score for a group comprises determining group interest scores for the group for the plurality of interests, and calculating the match score for the group as a dot product of the group interests scores and the post interest scores.

In one example, determining whether to recommend comprises calculating an intent of the post, and determining not to generate a recommendation when the intent of the post is within a predefined plurality of intents.

In one example, determining whether to recommend comprises, for each group, calculating a contribution of interests of a first level, in a hierarchy of interests, to the match score for the group; and eliminating the group from a possible recommendation when the contribution of interests of the first level is above a predetermined threshold.

In one example, determining whether to recommend comprises applying filtering criteria for the post and the plurality of groups: if the post is a candidate for the recommendation after the filtering, selecting the group, from the groups remaining after the filtering, with a highest match score; and recommending the group with the highest match score when the highest match score is above a predetermined threshold.

In one example, the method 1300 further comprises calculating group interest scores for the plurality of groups, wherein calculating the group interest scores for each group comprises identifying group posts that have interactions from group members, calculating interests scores for the identified group posts, and calculating the group interest scores based on the calculated interest scores for the identified group posts.

In one example, calculating the group interest score further comprises selecting a predetermined number of the highest group interest scores and discarding the remaining group interest scores.

In one example, causing presentation of the recommended group comprises presenting on a user interface a message that the post was successfully posted, a first option to add the post to the recommended group, and a second option to not add the post to the recommended group.

In one example, the plurality of groups includes groups where the user is a member.

In one example, the plurality of interests is part of an interest ontology with interests arranged in a hierarchical order, the plurality of interest comprising a subset of first-level interests and some interests having other sub-interests in a next level.

In view of the disclosure above, various examples are set forth below. It should be noted that one or more features of an example, taken in isolation or combination, should be considered within the disclosure of this application.

Another general aspect is for a system that includes a memory comprising instructions and one or more computer processors. The instructions, when executed by the one or more computer processors, cause the one or more computer processors to perform operations comprising: detecting a post of a user being added to an online service; determining post interest scores for the post, the post interest scores being for a plurality of interests, each interest being associated with a topic; calculating a match score for a plurality of groups based on the post interest scores, the match score for each group indicating a degree of relevance of the post to the group; determining whether to recommend a group, from the plurality of groups, for including the post of the user in a feed of the recommended group; and causing presentation of the recommended group based on the determined recommendation.

In yet another general aspect, a tangible machine-readable storage medium (e.g., a non-transitory storage medium) includes instructions that, when executed by a machine, cause the machine to perform operations comprising: detecting a post of a user being added to an online service; determining post interest scores for the post, the post interest scores being for a plurality of interests, each interest being associated with a topic; calculating a match score for a plurality of groups based on the post interest scores, the match score for each group indicating a degree of relevance of the post to the group; determining whether to recommend a group, from the plurality of groups, for including the post of the user in a feed of the recommended group; and causing presentation of the recommended group based on the determined recommendation.

Figure 14:
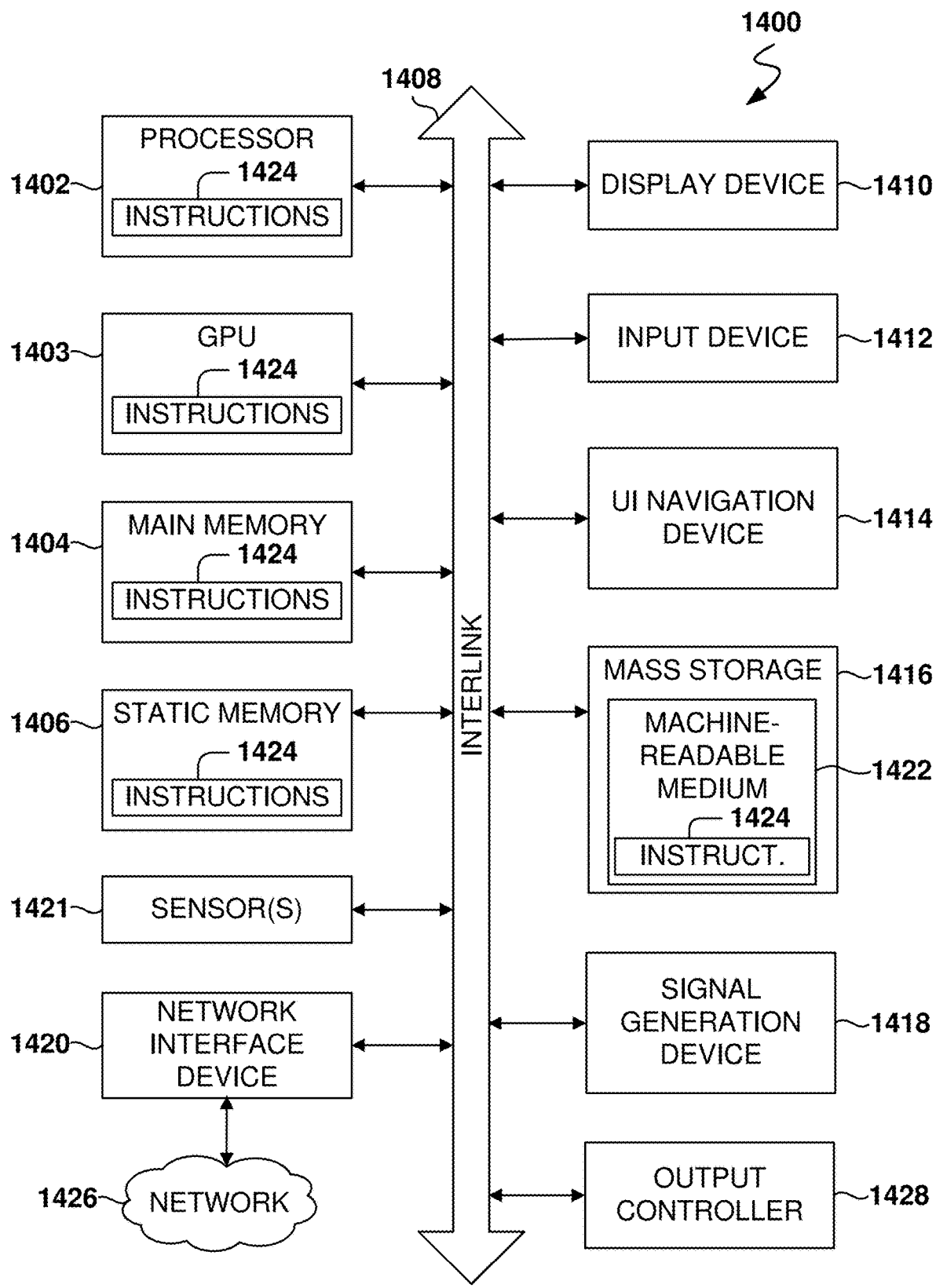
FIG. 14 is a block diagram illustrating an example of a machine upon or by which one or more example process embodiments described herein may be implemented or controlled.

FIG. 14 is a block diagram illustrating an example of a machine 1400 upon or by which one or more example process embodiments described herein may be implemented or controlled. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in a peer-to-peer (P2P) (or other distributed) network environment. Further, while only a single machine 1400 is illustrated, the term "machine" shall also be taken to include any collection of machines that individually or jointly execute a set (or multiple sets) of instructions to perform any one or more of the methodologies discussed herein, such as via cloud computing, software as a service (Saas), or other computer cluster configurations.

Examples, as described herein, may include, or may operate by, logic, various components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in the hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine 1400 (e.g., computer system) may include a hardware processor 1402 (e.g., a central processing unit (CPU), a hardware processor core, or any combination thereof), a graphics processing unit (GPU 1403), a main memory 1404, and a static memory 1406, some or all of which may communicate with each other via an interlink 1408 (e.g., bus). The machine 1400 may further include a display device 1410, an alphanumeric input device 1412 (e.g., a keyboard), and a user interface (UI) navigation device 1414 (e.g., a mouse). In an example, the display device 1410, alphanumeric input device 1412, and UI navigation device 1414 may be a touch screen display. The machine 1400 may additionally include a mass storage device 1416 (e.g., drive unit), a signal generation device 1418 (e.g., a speaker), a network interface device 1420, and one or more sensors 1421, such as a Global Positioning System (GPS) sensor, compass, accelerometer, or another sensor. The machine 1400 may include an output controller 1428, such as a serial (e.g., universal serial bus [USB]), parallel, or other wired or wireless (e.g., infrared (IR), near field communication [NFC]) connection to communicate with or control one or more peripheral devices (e.g., a printer, card reader).

The mass storage device 1416 may include a machine-readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within the static memory 1406, within the hardware processor 1402, or within the GPU 1403 during execution thereof by the machine 1400. In an example, one or any combination of the hardware processor 1402, the GPU 1403, the main memory 1404, the static memory 1406, or the mass storage device 1416 may constitute machine-readable media.

While the machine-readable medium 1422 is illustrated as a single medium, the term "machine-readable medium" may include a single medium, or multiple media, (e.g., a centralized or distributed database, and/or associated caches and servers) configured to store the one or more instructions 1424.

The term "machine-readable medium" may include any medium that is capable of storing, encoding, or carrying instructions 1424 for execution by the machine 1400 and that cause the machine 1400 to perform any one or more of the techniques of the present disclosure, or that is capable of storing, encoding, or carrying data structures used by or associated with such instructions 1424. Non-limiting machine-readable medium examples may include solid-state memories, and optical and magnetic media. In an example, a massed machine-readable medium comprises a machine-readable medium 1422 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 may further be transmitted or received over a communications network 1426 using a transmission medium via the network interface device 1420.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:
1. A computer-implemented method comprising:
 detecting a post of a user being added to an online service;
 determining post interest scores for the post, the post interest scores being for a plurality of interests, each interest being associated with a topic;

calculating a match score for a plurality of groups based on the post interest scores and group interest scores;

using an intent machine-learning (ML) model to calculate the group interest scores, wherein the intent ML model is trained with training data based on past content and assigned labels for corresponding intents;

determining whether to recommend a group, from the plurality of groups, for including the post of the user in a feed of the recommended group based on the match score; and within an order or less of a hundred milliseconds of the post of the user being added, causing, by a real-time nudge system, a presentation of the recommended group based on the determined recommendation.

2. The method as recited in claim 1, wherein calculating the match score for a group comprises:

determining group interest scores for the group for the plurality of interests; and calculating the match score for the group as a dot product of the group interests scores and the post interest scores.

3. The method as recited in claim 1, wherein determining whether to recommend comprises:

calculating, by the intent ML model, an intent of the post from a plurality of intents, the intent ML model taking the post as an input and generating as output one of the intents from the plurality of intents; and determining not to generate a recommendation when the intent of the post is within a predefined subset of the plurality of intents.

4. The method as recited in claim 1, wherein determining whether to recommend comprises:

for each group:

calculating a contribution of interests of a first level, in a hierarchy of interests, to the match score for the group; and eliminating the group from a possible recommendation when the contribution of interests of the first level is above a predetermined threshold.

5. The method as recited in claim 1, wherein determining whether to recommend comprises:

applying filtering criteria for the post and the plurality of groups;

if the post is a candidate for the recommendation after the filtering, selecting the group, from the groups remaining after the filtering, with a highest match score; and recommending the group with the highest match score when the highest match score is above a predetermined threshold.

6. The method as recited in claim 1, further comprising:

calculating group interest scores for the plurality of groups, wherein calculating the group interest scores for each group comprises:

identifying group posts that have interactions from group members;

calculating interests scores for the identified group posts; and calculating the group interest scores based on the calculated interest scores for the identified group posts.

7. The method as recited in claim 6, wherein calculating the group interest score further comprises:

selecting a predetermined number of the highest group interest scores and discarding the remaining group interest scores.

8. The method as recited in claim 1, wherein causing presentation of the recommended group comprises:

presenting on a user interface a message that the post was successfully posted, a first option to add the post to the recommended group, and a second option to not add the post to the recommended group.

9. The method as recited in claim 1, wherein the plurality of groups includes groups where the user is a member.

10. The method as recited in claim 1, wherein the plurality of interests is part of an interest ontology with interests arranged in a hierarchical order, the plurality of interest comprising a subset of first-level interests and some interests having other sub-interests in a next level.

11. A system comprising:

a memory comprising instructions; and one or more computer processors, wherein the instructions, when executed by the one or more computer processors, cause the system to perform operations comprising:

detecting a post of a user being added to an online service;

determining post interest scores for the post, the post interest scores being for a plurality of interests, each interest being associated with a topic;

calculating a match score for a plurality of groups based on the post interest scores and group interest scores;

using an intent machine-learning (ML) model to calculate the group interest scores, wherein the intent ML model is trained with training data based on past content and assigned labels for corresponding intents;

determining whether to recommend a group, from the plurality of groups, for including the post of the user in a feed of the recommended group based on the match score; and within an order or less of a hundred milliseconds of the post of the user being added, causing, by a real-time nudge system, a presentation of the recommended group based on the determined recommendation.

12. The system as recited in claim 11, wherein calculating the match score for a group comprises:

determining group interest scores for the group for the plurality of interests; and calculating the match score for the group as a dot product of the group interests scores and the post interest scores.

13. The system as recited in claim 11, wherein determining whether to recommend comprises:

calculating, by the intent ML model, an intent of the post from a plurality of intents, the intent ML model taking the post as an input and generating as output one of the intents from the plurality of intents; and determining not to generate a recommendation when the intent of the post is within a predefined subset of the plurality of intents.

14. The system as recited in claim 11, wherein determining whether to recommend comprises:

for each group:

calculating a contribution of interests of a first level, in a hierarchy of interests, to the match score for the group; and eliminating the group from a possible recommendation when the contribution of interests of the first level is above a predetermined threshold.

15. The system as recited in claim 11, wherein determining whether to recommend comprises:

applying filtering criteria for the post and the plurality of groups;

if the post is a candidate for the recommendation after the filtering, selecting the group, from the groups remaining after the filtering, with a highest match score; and recommending the group with the highest match score when the highest match score is above a predetermined threshold.

16. A tangible machine-readable storage medium including instructions that, when executed by a machine, cause the machine to perform operations comprising:

detecting a post of a user being added to an online service;

determining post interest scores for the post, the post interest scores being for a plurality of interests, each interest being associated with a topic;

calculating a match score for a plurality of groups based on the post interest scores and group interest scores;

using an intent machine-learning (ML) model to calculate the group interest scores, wherein the intent ML model is trained with training data based on past content and assigned labels for corresponding intents;

determining whether to recommend a group, from the plurality of groups, for including the post of the user in a feed of the recommended group based on the match score; and within an order or less of a hundred milliseconds of the post of the user being added, causing, by a real-time nudge system, a presentation of the recommended group based on the determined recommendation.

17. The tangible machine-readable storage medium as recited in claim 16, wherein calculating the match score for the group comprises:

determining group interest scores for the group for the plurality of interests; and calculating the match score for the group as a dot product of the group interests scores and the post interest scores.

18. The tangible machine-readable storage medium as recited in claim 16, wherein determining whether to recommend comprises:

calculating, by the intent ML model, an intent of the post from a plurality of intents, the intent ML model taking the post as an input and generating as output one of the intents from the plurality of intents; and determining not to generate a recommendation when the intent of the post is within a predefined subset of the plurality of intents.

19. The tangible machine-readable storage medium as recited in claim 16, wherein determining whether to recommend comprises:

for each group:

calculating a contribution of interests of a first level, in a hierarchy of interests, to the match score for the group; and eliminating the group from a possible recommendation when the contribution of interests of the first level is above a predetermined threshold.

20. The tangible machine-readable storage medium as recited in claim 16, wherein determining whether to recommend comprises:

applying filtering criteria for the post and the plurality of groups;

if the post is a candidate for the recommendation after the filtering, selecting the group, from the groups remaining after the filtering, with a highest match score; and recommending the group with the highest match score when the highest match score is above a predetermined threshold.

* * * * *